US010351240B1

(12) United States Patent
Sills et al.

(10) Patent No.: US 10,351,240 B1
(45) Date of Patent: Jul. 16, 2019

(54) METHODS AND SYSTEMS FOR COOPERATIVE OPERATION AND CONFIGURATION OF AERIALLY-MOBILE DEVICES

(71) Applicant: Wing Aviation LLC, Mountain View, CA (US)

(72) Inventors: Maxwell Andrew Sills, San Francisco, CA (US); Ian Wetherbee, San Jose, CA (US); Robert Samuel Gordon, San Bruno, CA (US)

(73) Assignee: Wing Aviation LLC, Mountain View, CA (US)

( * ) Notice: Subject to any disclaimer, the term of this patent is extended or adjusted under 35 U.S.C. 154(b) by 83 days.

(21) Appl. No.: 15/394,531

(22) Filed: Dec. 29, 2016

Related U.S. Application Data

(60) Provisional application No. 62/281,687, filed on Jan. 21, 2016.

(51) Int. Cl.
| | |
|---|---|
| *G05D 1/10* | (2006.01) |
| *B64C 39/02* | (2006.01) |
| *B64C 39/00* | (2006.01) |
| *H04B 7/185* | (2006.01) |

(Continued)

(52) U.S. Cl.
CPC ............ *B64C 39/024* (2013.01); *B64F 1/00* (2013.01); *G05D 1/0088* (2013.01); *H04B 7/18506* (2013.01); *B64C 2201/021* (2013.01); *B64C 2201/027* (2013.01); *B64C 2201/101* (2013.01); *B64C 2201/108* (2013.01); *G05D 1/0094* (2013.01); *G05D 1/104* (2013.01)

(58) Field of Classification Search
CPC .............. G05D 1/0094; G05D 1/104; B64C 2201/122; B64C 2201/123; B64C 2201/126; B64C 2201/127
See application file for complete search history.

(56) References Cited

U.S. PATENT DOCUMENTS

| | | | |
|---|---|---|---|
| 9,139,310 B1 | 9/2015 | Wang | |
| 9,454,157 B1 * | 9/2016 | Hafeez | G05D 1/104 |
| 9,583,006 B2 * | 2/2017 | Srivastava | G01C 21/20 |

(Continued)

*Primary Examiner* — Todd M Melton
(74) *Attorney, Agent, or Firm* — McDonnell Boehnen Hulbert & Berghoff LLP

(57) ABSTRACT

Methods and systems for autonomous device reconfiguration are described herein. A system may include aerially-mobile devices each configured to perform a respective end-use function and carry out a portion of a reconfiguration operation, which involves arranging the one or more aerially-mobile devices according to a device configuration. A given device configuration may specify spatial locations within an environment corresponding to the aerially-mobile devices. The system may also include a control system configured to facilitate a reconfiguration operation by executing instructions including: (i) determining, for each aerially-mobile device, a respective spatial location associated with a particular device configuration; (ii) detecting a triggering event indicative of an instruction to arrange aerially-mobile devices according to the particular device configuration; and (iii) responsive to the detection of the triggering event, causing each aerially-mobile device to begin flying to its respective spatial location associated with the particular configuration.

15 Claims, 11 Drawing Sheets

(51) Int. Cl.
    *G05D 1/00*         (2006.01)
    *B64F 1/00*         (2006.01)

(56)                 References Cited

U.S. PATENT DOCUMENTS

| | | |
|---|---|---|
| 9,609,284 B2 * | 3/2017 | Urbach .................. H04N 7/181 |
| 2015/0294514 A1 | 10/2015 | McCollum et al. |
| 2015/0312774 A1 | 10/2015 | Lau |
| 2015/0316927 A1 | 11/2015 | Kim et al. |
| 2015/0362917 A1 | 12/2015 | Wang et al. |
| 2017/0053169 A1 * | 2/2017 | Cuban .................... H04N 7/185 |

* cited by examiner

METHODS AND SYSTEMS FOR COOPERATIVE OPERATION AND CONFIGURATION OF AERIALLY-MOBILE DEVICES

CROSS-REFERENCE TO RELATED APPLICATIONS

This application claims priority to U.S. Patent App. No. 62/281,687, entitled "Methods and Systems for Cooperative Operation and Configuration of Aerially-Mobile Devices", filed Jan. 21, 2016, the contents of which are fully incorporated by reference herein for all purposes.

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Example implementations may relate to a device system that is capable of autonomous configuration within an environment in order to perform a cooperative function. The devices in the system may, in addition to having one or more end-use functions (e.g., audio output, networking, projection, etc.), also be capable of aerial mobility. In some instances, a control system may cause the devices to arrange themselves according to a predetermined configuration. In other cases, a control system may receive goal(s) and/or constraint(s), and determine a configuration that satisfactorily accomplishes the goal(s) without violating the constraint(s) based on the devices in the system and environmental parameters. Regardless, the device system can autonomously reconfigure itself in order to carry out one or more cooperative functions.

In one aspect, a system is described. The system includes one or more aerially-mobile devices and a control system. The one or more aerially-mobile devices are each configured to (i) perform a respective end-use function and (ii) carry out a portion of a reconfiguration operation. The reconfiguration operation includes arranging the one or more aerially-mobile devices according to a device configuration. A given device configuration specifies one or more spatial locations within an environment corresponding to the one or more aerially-mobile devices. The control system is configured to facilitate a reconfiguration operation by executing instructions. The instructions include determining, for each aerially-mobile device, a respective spatial location associated with a particular device configuration. The instructions also include detecting a triggering event indicative of an instruction to arrange the one or more aerially-mobile devices according to the particular device configuration. The instructions further include causing each aerially-mobile device to begin flying to its respective spatial location associated with the particular configuration responsive to the detection of the triggering event.

In another aspect, an aerially-mobile device is provided. The aerially-mobile device includes a propulsion system, an end-use system, and a controller. The propulsion system is controllable to cause the aerially-mobile device to fly to locations within an environment. The end-use system is configured to carry out an end-use function of the aerially-mobile device. The controller is configured to perform a set of operations. The operations include obtaining a portion of a device configuration, wherein the device configuration at least specifies a spatial location within the environment for the aerially-mobile device. The operations also include receiving an instruction to arrange the aerially-mobile device according to the obtained portion of the device configuration. The operations further include causing the propulsion system to begin flying the aerially-mobile device toward the specified location upon receiving the instruction.

In yet another aspect, a method is provided. The method involves determining, by a computing device, a device configuration indicative of an arrangement of a plurality of aerially-mobile devices within an environment. The device configuration specifies a spatial location for each aerially-mobile device within the environment. The method also involves receiving an input indicative of an instruction to arrange the plurality of aerially-mobile devices according to the device configuration. The method further involves causing each aerially-mobile device to begin flying to the respective spatial location in the environment specified by the device configuration responsive to receiving the input.

In yet another aspect, a system is provided. The system includes a means for determining, by a computing device, a device configuration indicative of an arrangement of a plurality of aerially-mobile devices within an environment. The device configuration specifies a spatial location for each aerially-mobile device within the environment. The system also includes a means for receiving an input indicative of an instruction to arrange the plurality of aerially-mobile devices according to the device configuration. The system further includes a means for causing each aerially-mobile device to begin flying to the respective spatial location in the environment specified by the device configuration responsive to receiving the input.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this docu-

DETAILED DESCRIPTION

Figure 1A:
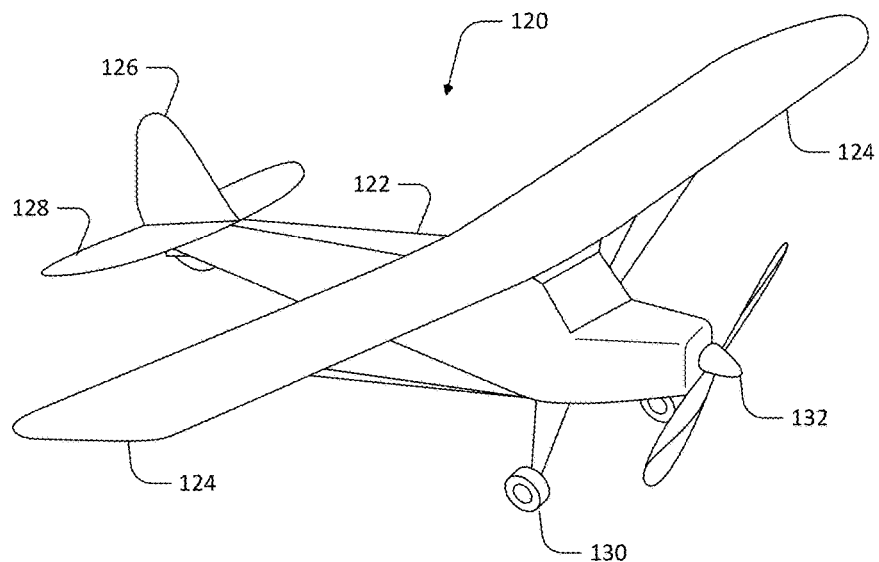
FIGS. 1A, 1B, 1C, and 1D are simplified illustrations of unmanned aerial vehicles, according to example embodiments.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

As device systems become increasingly large and complex, setting up those devices according to a particular configuration can take considerable time and effort. Manual reconfiguration by an individual can be tedious and prone to error. Additionally, a set of devices may collectively be used to perform multiple cooperative functions. Configuring these devices to carry out a particular cooperative function manually may involve an individual with knowledge of the system physically moving, orienting, powering, and wiring those devices.

In a home setting, devices such as speakers, routers, lighting, displays, and projectors might be used in combination to act as a home theater, a home office, or provide music for a social gathering, for example. At a concert venue, devices such as speakers, lighting, and microphones might be arranged in a variety of ways, depending upon the particular artist or act being performed on stage. A variety of other environments might also utilize a device system that can be configured in various easy to carry out various cooperative functions.

Example implementations may relate to methods, systems, and control techniques for facilitating the autonomous configuration of a system of aerially-mobile devices. The aerially-mobile devices may each carry out one or more end-use functions (e.g., audio output, audio input, networking, visual output, illumination, etc.), and may also include aspects of an unmanned aerial vehicle (UAV), such as systems for propulsion, control, imaging, communication, and power. The devices in the system may employ their aerial capabilities in order to arrange themselves according to a particular configuration. A configuration may specify the locations, orientations, and operational parameters of one or more devices in the system. A control system—which might be in communication with the aerially-mobile devices or incorporated within the aerially-mobile devices—may instruct the devices and cause them to transition into a particular configuration.

By way of example, a home theater device system may include a set of speakers and a projector. The speakers and projector may be positioned at predetermined "docking" locations. The speakers may be arranged to provide either stereo audio or surround sound. The projector may be placed at various distances from a wall in order to provide various effective screen sizes. A control system might have predetermined knowledge of two configurations: a "movie" configuration, and a "music" configuration. The "movie" configuration might specify that the speakers be arranged in surround sound locations and that the projector be placed far from the wall, such that the projected screen is large. The "music" configuration might have the projector placed closed to the wall, and arrange the speakers to provide stereo audio. If the system is in the "movie" configuration, the control system could carry out a transition to the "music" configuration by instructing the speakers to arrange themselves in stereo (i.e., left/right audio) and by instructing the projector to move to a ceiling mount that is closer to the projection wall. Then, those devices might initiate flight towards their respective predetermined destinations.

In some implementations, a predetermined destination for a device may include an apparatus that acts as a "dock" for the device. The dock may provide a mechanical link that secures the device to the dock. The dock may also include power transfer capabilities (e.g., electrical contacts or inductive charging) for charging the docked device. The dock could also include other systems that facilitate short range communication and/or wired connections for transmitting and/or receiving information or signals for network connectivity, audio transmission, data transmission, etc.

In some implementations, a device system might include one or more inductive chargers placed at various locations (e.g., ceilings or walls) within an environment. An aerially-mobile device could include wireless charging hardware that can couple to electromagnetic fields generated by the inductive chargers to receive power that drives the propulsion system of the aerially-mobile device. An aerially-mobile device transitioning from one location to a destination may fly in close proximity with an inductive charger, such that the aerially-mobile device receives power during flight to ensure that it is sufficiently powered to reach its destination. The arrangement of such inductive chargers may depend upon expected flight paths, locations of other electronic components, and/or the geometry of the environment, among other factors.

In some embodiments, the control system stores one or more predetermined configurations. The configurations may specify the locations, orientations, and/or operational parameters of one or more devices in the system. For example, a speaker configuration might designate, for one or more speakers, a location for the speaker, an orientation of the speaker (i.e., where it's aimed), and a role for that speaker (e.g., the channel in a multi-channel system, such as a "front left" or "center" speaker). These configurations may be designated by manufacturers, set up by users, or computationally determined.

In other embodiments, the control system may determine—prior to flight and/or during flight—a configuration that accomplishes one or more goals. The control system may receive a goal for a configuration that indicates a desired cooperative function for the device system. The control system may also receive—as user input or through sensor observations—constraints that restrict the flight and aspects of the configuration. The control system may carry out a computational analysis (e.g., a constrained optimization) to determine a device configuration that both satisfactorily accomplishes the goal or goals and does not violate the constraint(s).

For example, a device system may be flight-enabled light bulbs. An example goal might be to maximize illumination in a particular space. The constraints may include the room geometry and locations of light bulb sockets to which the light bulbs must be secured to be powered and provide illumination, among other possible constraints. The control system may computationally determine the set of docking locations for the flight-enabled light bulbs that provides the best possible illumination (or satisfactory illumination, e.g., to within a threshold level of illumination).

In some embodiments, a configuration may, in addition to specifying the arrangement and operational parameters of the devices, also include a predetermined flight plan for the devices. A given flight plan may specify the timing and path of flight for each device in the system as they transition from one configuration (or no configuration) to another configuration. Some implementations may include a control system that performs this pre-flight planning to avoid device collisions and/or to improve the efficiency of the transition. Additionally, due to certain design considerations and limitations, a given device may only be able to fly for a limited duration of time. Pre-flight planning may be performed to ensure that each device can safely fly to its destination given such limitations.

In other embodiments, no predetermined flight plans are performed, and each aerially-mobile device may include vision, sensing, and/or communication systems that enable the devices to make adjustments mid-flight to avoid collisions. In some implementations, each device may include a short range wireless communication system that allows the aerially-mobile devices to communicate during flight. In other implementations, each device may be able to sense nearby devices during flight using cameras, RADAR, LIDAR, proximity sensors, and/or other computer vision-based sensing technologies. If a device determines through such sensing systems that a collision may occur with a nearby device, it may alter its heading and/or speed in order to prevent a collision from occurring.

It should be understood that, as described herein, a "control system" may take on many different forms. In some implementations, the control system may be a separate computing device communicatively coupled with one or more of the devices in the system. In other implementations, the control system may be collectively formed by computing devices or controllers integrated within the devices, such that control system can be "ad hoc" with respect to the devices. Each device within the system could constitute a portion of the overall control system; for example, each device might have stored thereon a set of locations corresponding to respective set of configurations. In order to transition to a certain configuration, each device may be instructed to fly to its respective stored location associated with that configuration. Each device may also incorporate vision or sensing systems that work out various aspects of the flight specifics and avoid collisions with objects in the environment and/or with other aerially-mobile devices.

It should also be understood that example devices, systems, and configurations described herein are provided for explanatory purposes. Any number of devices, each capable of performing any number of end-use functions, may form a device system that utilizes the autonomous reconfiguration techniques disclosed herein. The device system may be present within any kind of environment, including indoor settings, outdoor environments, or some combination thereof.

II. ILLUSTRATIVE UNMANNED VEHICLES

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A shows an example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1B:
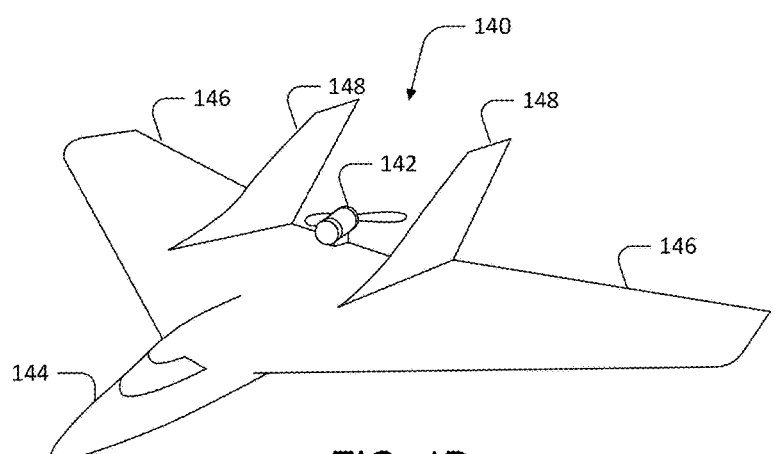

FIG. 1B shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1C:
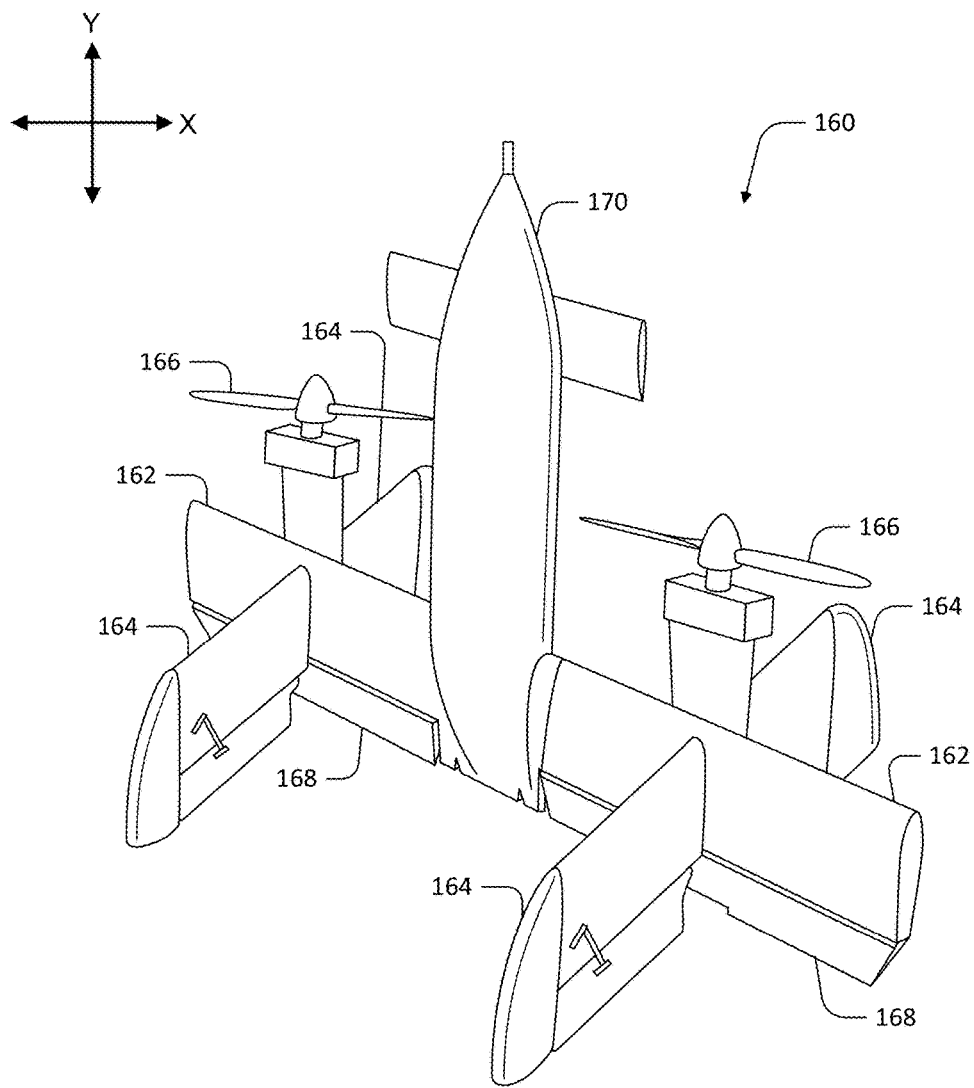

FIG. 1C shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 3). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1D:
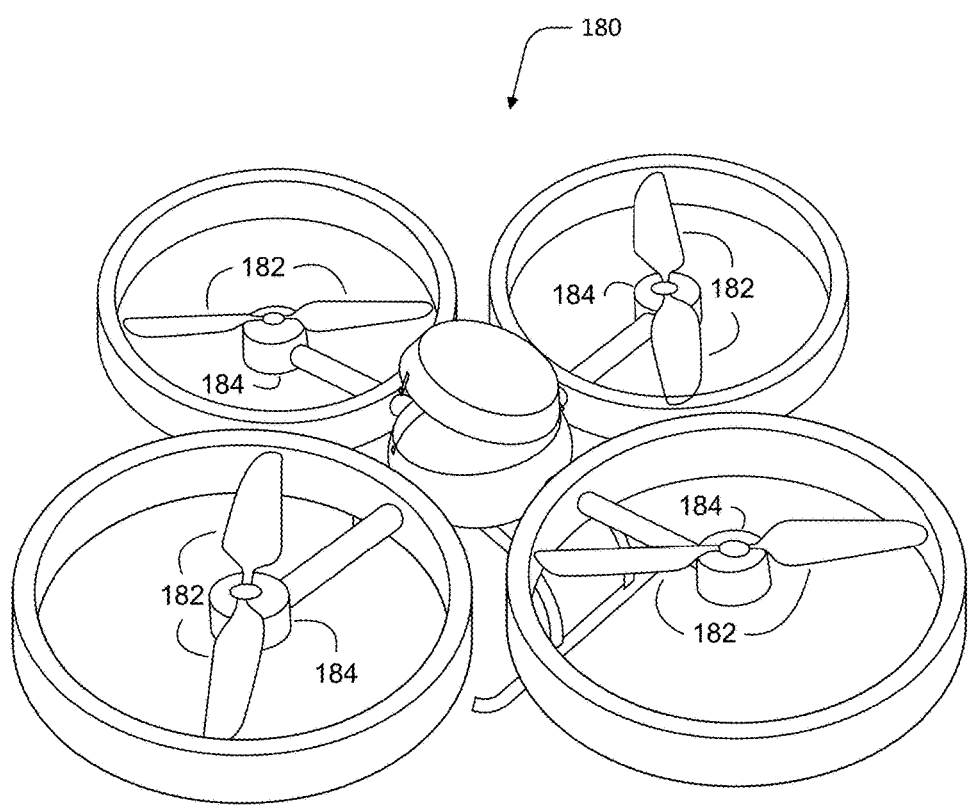

As noted above, some embodiments may involve other types of UAVs, in addition to or in the alternative to fixed-wing UAVs. For instance, FIG. 1D shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV.

Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
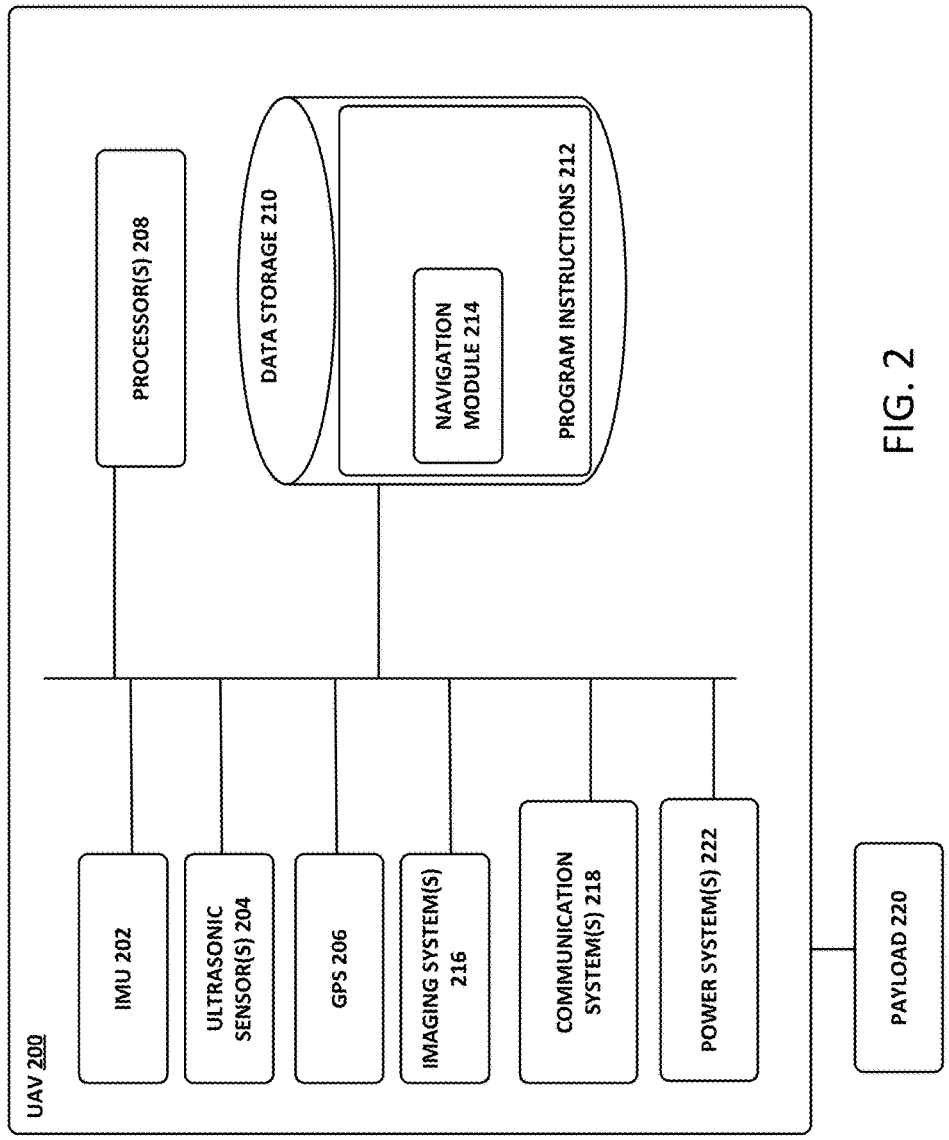
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 120, 140, 160, and 180 described in reference to FIGS. 1A-1D. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s) 216. For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 220 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 220 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 222. The power system 222 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Illustrative UAV Deployment Systems

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area.

Figure 3:
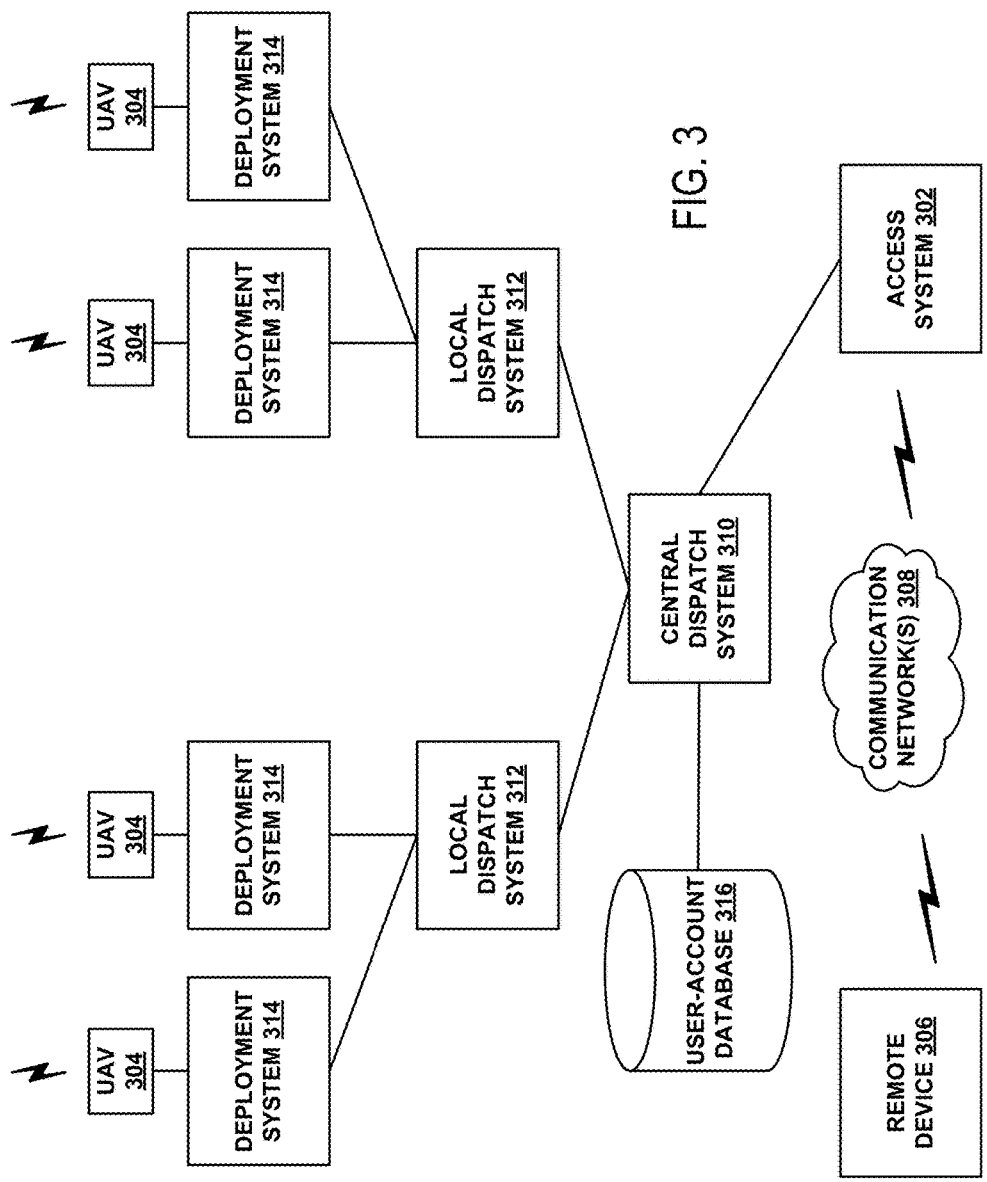
FIG. 3 is a simplified block diagram illustrating a UAV system, according to an example embodiment.

FIG. 3 is a simplified block diagram illustrating a distributed UAV system 300, according to an example embodiment. In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1D. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch.

Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

IV. EXAMPLE DEVICE SYSTEMS

Autonomously or semi-autonomously reconfigurable device systems may include a variety of components that facilitate the transfer of information, instructions, and power. Some device systems may include a network through which devices—such as aerially-mobile devices, computing devices, controllers, and/or other devices—convey instructions, data, statuses, and other information. In some implementations, the network may be centralized; in others, it may be distributed, where devices can act as network access points, allowing for relayed communications from device to device. A device system may also include wired chargers, wireless power transmitters, or any combination thereof to energize various devices within the system. Collectively, the devices and components within the system may be present within an environment, which may include indoor areas, outdoor areas, or some combination thereof.

Figure 4:
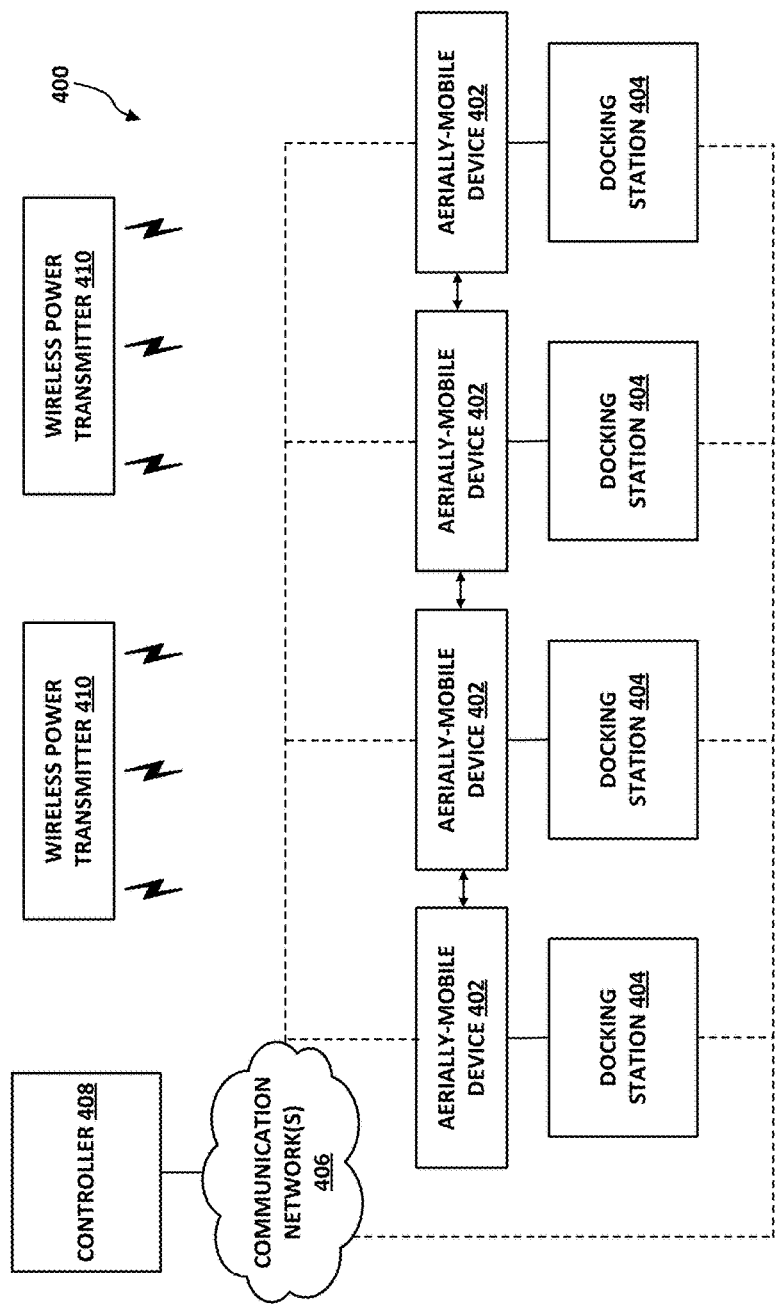
FIG. 4 is a simplified block diagram illustrating an example device system, according to an example embodiment.

FIG. 4 is a simplified block diagram illustrating an example device system 400.

The device system 400 includes aerially-mobile devices 402, docking stations 404, communication network(s) 406, a controller 408, and wireless power transmitters 410. The aerially-mobile devices may be any kind of electronic device that performs any number of end-use functions; some example aerially-mobile devices are described in the following section. The docking stations 404 may provide any combination of power, network connectivity, and/or mechanical connections to a docked aerially-mobile device 402. The communication network(s) 406 may provide a communicative connection through which the aerially-mobile devices 402, docking station 404, controller 408, and/or other devices communicate. The controller 408 may instruct the aerially-mobile devices 402 and guide the autonomous or semi-autonomous reconfiguration of those aerially-mobile devices 402. The wireless power transmitters 410 may supply power to the aerially-mobile devices 402 as they fly between docking stations 404 during reconfiguration operations.

An aerially-mobile device 402 may be any device that performs an end-use function and includes aerial capabilities. Example end-use functions includes audio output (e.g., a speaker), audio input (e.g., a microphone), visual output (e.g., a projector), visual input (e.g., a camera), network connectivity (e.g., a router), illumination (e.g., a light source), and/or other possible end-use functions. The aerially-mobile device 402 may also include a propulsion system that enables the aerially-mobile device 402 to fly for some duration of time. Some example propulsion systems include wings, propellers, turbines, and/or any other possible propulsion systems. The aerially-mobile device 402 may also include navigation systems, sensors, control systems, processors, data storage, a battery or other power storage element, network communication interfaces, and/or charging interfaces, among other possible components. Collectively, the aerially-mobile device may be a device capable of receiving instructions, flying from one location to another, sensing nearby other aerially-mobile devices and/or docking stations, and carrying out its respective end-use function.

A docking station 404 may be an apparatus that acts as a landing destination for an aerially-mobile device 402. In some implementations, the docking station 404 may provide a mechanical connection to an aerially-mobile device, either through a protrusion or depression onto which an aerially-mobile device 402 can be seated, or through some other securing mechanism (e.g., a latch, hook, fastener, magnet, electromagnet, etc.). The docking station 404 may also act as a charger for an energy storage element in an aerially-mobile device 402, either through electrical contacts or wireless power transmission (e.g., inductive charging). The docking station 404 may also communicatively connect to an aerially-mobile device 402, either through a direct connection or via wireless communication means (e.g., Wi-Fi, Wi-Fi direct, Bluetooth, a local area network, short-range communications, near-field communication, etc.). The docking station 404 may also interface with other components, such as the controller 408, to provide information about its status or the aerially-mobile device 402 connected thereto (and information about that aerially-mobile device 402, such as its capabilities, charge level, etc.).

The docking station 404 may additionally convey instructions (either through a wired connection, wireless connection, or near-field communication) to a docked aerially-mobile device. For example, a control system may detect an event that triggers a reconfiguration. The control system may then cause the docking station 404 (and/or other docking stations in the system) to transmit an instruction to a docked aerially-mobile device to begin reconfiguration according to a particular device configuration. The docking station 404 may also include sensors that can detect changes in the state of a docked aerially-mobile device, which may be conveyed to a control system. For example, the docking station 404 may determine that a docked aerially-mobile device is fully charged (e.g., when it is drawing a small threshold amount of current from a power source), indicating the state change of "charged" for that aerially-mobile device. Such state changes may be conveyed to the control system, which may determine whether or not to execute a reconfiguration operation based on the state changes. The docking station 404 could also detect other state changes, such as changes in the environment (e.g., the arrangement of furniture, changes in lighting conditions, etc.), through sensors or other devices incorporated within the docking station 404.

The communication network(s) 406 may include any combination of wired and/or wireless communication networking to facilitate the transfer of information among the devices in the system 400. The communication network(s) 406 may be formed using one or more routers or other local area network (LAN) devices. The communication network(s) 406 may also include a combination of short range device-to-device communication links, such as direct wireless communication between two aerially-mobile devices 402. During certain operations, the communication network(s) 406 may convey instructions and/or data—such as aerially-mobile device configurations or predetermined flight paths—to the aerially-mobile devices 402. Other kinds of communication are also possible.

The controller 408 may be a computing device that facilitates the reconfiguration of the aerially-mobile devices 402 from one configuration (or no configuration) to another configuration. In some embodiments, the controller 408 may have stored thereon device configuration information, which may include device locations, orientations, operational parameters, and/or other information. To reconfigure the device system 400 (that is, to alter the locations, orientations, and/or operational parameters of one or more of the aerially-mobile devices 402), the controller 408 may transmit a location, orientation, and/or operational parameters to each aerially-mobile device 402. Each aerially-mobile device 402 may receive that information, fly to its new specified location, arrange itself according to the designated orientation, and configure itself to operate in accordance with the specified operational parameters.

The controller 408 may also perform computations to determine a device configuration. In some embodiments, the device configuration may be determined based on one or more goals and/or constraints. The controller 408 may receive goal(s) and constraint(s), and subsequently determine a device configuration that satisfactorily accomplishes the goal(s) while not violating (or permissibly violating) the constraint(s). The controller 408 may, for example, encode the goals and constraints into objective functions, cost functions, reward functions, and/or utility functions and then perform a constrained optimization to determine a device configuration.

The controller 408 may further perform computations to determine flight paths and timing for the aerially-mobile devices 402. For instance, the controller 408 may receive information about the current locations of aerially-mobile devices 402, obtain a new device configuration that includes new locations for the aerially-mobile devices 402, and then determine the flight paths and timing. Such flight path determination may be conducted to avoid collisions, minimize or reduce the amount of time that the reconfiguration takes, improve the efficiency of the reconfiguration, and/or to ensure that each aerially-mobile device 402 is capable of flying from its current location to its new location (since the duration of flight and/or capable flight distance may be limited due to the propulsion design or battery capacity and charge).

The wireless power transmitter 410 may be any electrical device capable of conveying energy without a wired connection. In some implementations, the wireless power transmitter 410 may include coils and/or other power electronics that facilitate inductive power transfer. The aerially-mobile devices 402 may include electrical components (such as coils or inductors) that magnetically couple to the wireless power transmitters 410 to receive power. The amount of power conveyed, and whether or not a wireless power transmitter 410 is active, may depend upon the proximity of an aerially-mobile device, whether or not the devices are undergoing reconfiguration, and/or other considerations. The wireless power transmitters 410 may be coupled to walls, ceilings, the ground, within a docking station 404, and/or placed at any other location within an environment.

It should be understood that the device system 400 in FIG. 4 is merely one example device system. Other example device systems may include fewer or additional components, and may have any number of aerially-mobile devices 402, docking stations 404, communication network(s) 406, controllers 408, and/or wireless power transmitters 410. For instance, some systems may include more docking stations 404 than aerially-mobile devices 402; others may have fewer docking stations 404 than aerially-mobile devices 402. In some systems, the controller 408 may be integrated within one or more aerially-mobile device 402 or located remotely and accessible over a wide area network or the Internet. Other systems may be implemented in various ways without departing from the scope of the present application.

V. EXAMPLE AERIALLY-MOBILE DEVICES

An aerially-mobile device may be any device that includes any number of subsystems and components that facilitate the autonomous or semi-autonomous reconfiguration techniques disclosed herein. Some example aerially-mobile devices may be existing components that are retrofitted with components of a UAV. Other aerially-mobile devices may be designed as UAVs that additionally carry out some end-use function. Various kinds of aerially-mobile devices may be incorporated within a system, where each of those aerially-mobile devices may differ in design and functionality.

Figure 5:
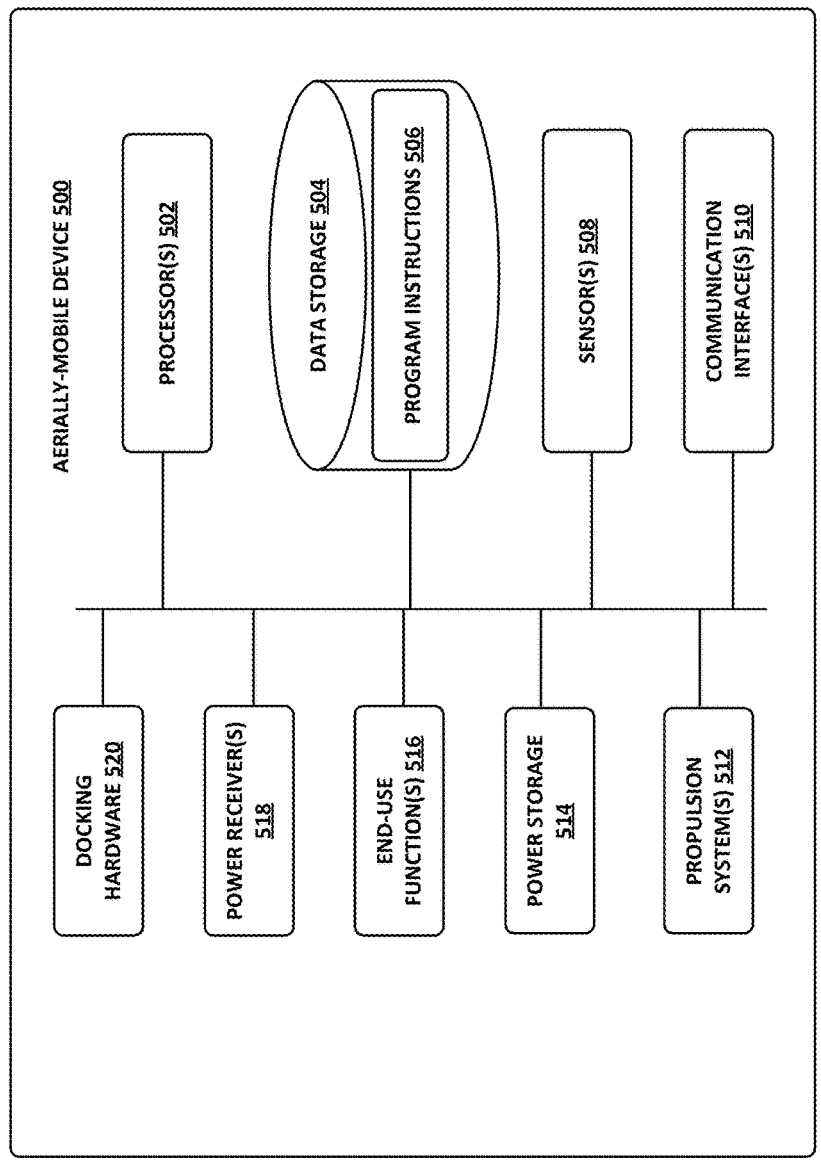
FIG. 5 is a simplified block diagram illustrating components of an aerially-mobile device, according to an example embodiment.

FIG. 5 is a simplified block diagram illustrating components of an aerially-mobile device 500. The aerially-mobile device 500 includes processor(s) 502, data storage 504, program instructions 506, sensor(s) 508, communication interface(s) 510, propulsion system(s) 512, power storage 514, end-use function(s) 516, power receiver(s) 518, and docking hardware 520. Note that the aerially-mobile device 500 is shown for illustration purposes and may include additional components and/or have one or more components removed without departing from the scope of the disclosure. Further, it should be understood that the various components of aerially-mobile device 500 may be arranged and connected in any manner.

Moreover, the above description of processor(s), data storage, program instructions, sensors, and/or wireless communication interface(s) may apply to any discussion below relating to the respective component being used in another system or arrangements. For instance, as noted, FIG. 5 (among other possible figures) illustrates processors, data storage, program instructions, sensors, and/or wireless communication interface(s) as being incorporated in another arrangement. These components at issue may thus take on the same or similar characteristics (and/or form) as the respective components discussed above in association with FIG. 6. However, the components at issue could also take on other characteristics (and/or form) without departing from the scope of the disclosure.

The propulsion system(s) 512 may include mechanical and/or electrical components that facilitate flight. The propulsion system(s) 512 may include propellers, turbines, fans, wings, propellant, engines, motors, and/or mechanical or electromechanical devices. The propulsion system(s) 512 may also include electronic components that power and control mechanical components. For example, the propulsion system(s) 512 may incorporate a control system (e.g., integrated circuits, computing devices, ASICs, etc.) that controls the propulsive components. Other electrical or control subsystems may be included within the propulsion system(s) 512 to assist in navigation, computer vision, and/or proximity sensing. Such a control system may be capable of receiving high-level instructions (e.g., fly to a particular location), and can then work out the controls necessary to carry out those instructions. Some aerially-mobile devices may additionally carry out autonomous safety or avoidance behaviors, such as making flight adjustments to avoid (or keep a safe distance from) obstacles and/or other nearby aerially-mobile devices.

The power storage 514 may be any electrical or mechanical device for storing energy. Some examples of power storage 514 include batteries, capacitors, supercapacitors, chemical storage, a wound spring or coil, and/or any other possible energy storage means or combination thereof. The power storage 514 may supply power to the propulsion system(s) 512 during reconfiguration, and may be rechargeable via a charger at a docking station or through inductive charging. In some implementations, the power storage 514 may also supply power to other components of the aerially-mobile device 500, such as the communication interface(s) 510, sensor(s) 508, and/or other components that are operational during a reconfiguration flight.

The end-use function(s) 516, as described above, may be the primary function of the aerially-mobile device 500 when not undergoing reconfiguration. An end-use function may include human-perceivable outputs, human-receivable inputs, network connectivity, and/or any other possible device function. The end-use function may permit the aerially-mobile device 500 to act as a speaker, microphone, projector, display, light source, network router, camera, and/or any other kind of device.

The end-use function(s) 516 may also be parameterized, such that aspects of its operation can be adjusted or reconfigured. For example, an aerially-mobile speaker may be configured to act as a particular channel in a multi-channel audio output setup (e.g., the front left speaker of a surround sound system). As another example, the brightness of an aerially-mobile light source might be adjustable, where its luminosity is an operational parameter. As such, a reconfiguration operation may, in addition to arranging and orienting the aerially-mobile devices, involve setting operational parameters of the end-use function(s) 516 of the aerially-mobile device 500.

The power receiver(s) 518 may be any combination of wired and/or wireless power receivers capable of receiving power transmitted from a respective wired or wireless power transmitter or source. A wired power receiver may be a power terminal made of electrical contacts through which an electrical connection can be made with a wired power source. A wireless power receiver may be a coil and/or other electronics that collectively enable the aerially-mobile device 500 to magnetically couple to a wireless power transmitter to receive power. The aerially-mobile device 500 may also include electrical components that facilitate voltage regulation, up-conversion, down-conversion, and/or facilitate the charging of the power storage 514. In an embodiment, the power receiver 518 may be configured to magnetically couple with a given wireless power transmitter when the aerially-mobile device is within a threshold distance from the given wireless power transmitter. The threshold distance may depend on the coupling factor between the power receiver 518 and the wireless power transmitter.

The docking hardware 520 may be any mechanical element that allows the aerially-mobile device 500 to couple to a docking station. In some implementations, the docking hardware 520 could be a protrusion or impression that fits into or onto a corresponding impression or protrusion of a docking station. The docking hardware 520 could also be a mechanical or magnet device that secures the aerially-mobile device 500 to a docking station, such as a hook, latch, fastener, magnet, and/or electromagnet, among other possible securing devices. Further, the docking hardware 520 may include hardware to facilitate power and/or data connections with a docking station.

In addition to the above-described components, the aerially-mobile device 500 may also include other sensors, transducers, imagers, and/or other electronic devices or components to facilitate flight and/or reconfiguration. For example, an aerially-mobile speaker may include one or more microphones that aid in the reconfiguration operation. Such an aerially-mobile speaker may listen for a particular reference tone emitted by another aerially-mobile speaker and evaluate the qualities of the captured audio, which may serve as a basis for making adjustments to the configuration. As one example, quiet captured audio may indicate that the two speakers are too far apart, while loud captured audio may indicate that the two speakers are too close to each other. The quality of the captured audio may be analyzed by an onboard processor or a control system to determine the distance of another speaker, direction of another speaker, orientation of another speaker, and/or to evaluate the acoustic qualities of a particular environment.

III. EXAMPLE CONFIGURATIONS

A device "configuration" described herein may refer to a spatial and operational arrangement of one or more aerially-mobile devices in a system. A device configuration may specify the locations, orientations, and/or operational parameters of one or more aerially-mobile devices, the collective arrangement of which forms a device system for carrying out some task or serving some function.

Locations may be spatial locations within a particular environment. In some implementations, an environment may have predetermined boundaries, and the "locations" included in a device configuration may be coordinates relative to some origin within those boundaries. In other implementations, a location may be one of a number of predefined spatial positions in the environment, such as the locations of docking stations. Regardless of the particular implementation, a location may specify a position (in one, two, or three dimensions) at which an aerially-mobile device is designated to be situated in a device configuration.

Orientations may be angular positions of devices at a particular location. A device may be asymmetric (to some extent), such that its angular position may influence its operation. For example, a speaker may be designed to convey sound waves in a particular direction, and the orientation of that speaker may indicate where the speaker output is directed. Note that some device configurations may not necessarily specify orientation (e.g., for a device with an omnidirectional antenna acting as a wireless router).

An operational parameter may be any adjustable setting, control, level, mode, or designation of an end-use function of an aerially-mobile device. For a speaker, an operational parameter may be a speaker designation (e.g., center channel, front right channel, back left channel, etc.), loudness (i.e., volume level), or equalizer settings (e.g., tuning analog or digital filters), among other possible operational parameters. Setting these operational parameters may involve adjusting some value in software or firmware of the aerially-mobile speaker, or controlling the operation of some circuitry or electronic component within the aerially-mobile speaker. As another example, a projector might have operational parameters such as brightness, video input source, resolution, focus, sleep timers, and/or other adjustable settings of the projector. As yet another example, a network router might have operational parameters of signal output strength, a wireless network ID, encryption settings, passwords, domain name system settings, and other possible router settings. It should be understood that "operational parameter" refers to any setting relating to an end-use function of an aerially-mobile device.

Note that a device configuration may, in some cases, only specify one of a location, orientation, or operational parameter. Certain device configurations may involve only repositioning some aerially-mobile devices and only modifying the operational parameters of other aerially-mobile devices. In some implementations, a device configuration may specify a new location, a new orientation, and/or new operational parameters for each device; as such, some devices may not be repositioned, others may not be reoriented, and others may not have their operational parameters modified. Furthermore, some devices may only operate in one particular manner, such that the operational parameters (if they exist) of those devices cannot be modified. It should be understood that a device configuration does not necessarily involve changing a device's position, orientation, and operation; it may involve any combination of changes, or no change at all for a given device.

IV. EXAMPLE SCENARIOS

There are a variety of scenarios in which the autonomous or semi-autonomous device reconfiguration techniques disclosed herein may be used. Some example settings include homes, concert venues, warehouses, laboratories, recreational events, convention centers, and industrial locations, among other possible settings. Within these environments, any number of aerially-mobile devices may be deployed to perform one or more tasks or serve some collective function. The sizes, geometries, arrangements, presence of obstacles, and/or presence of people may vary depending on the environment.

Within a home setting, household electronic devices may be equipped with aerial capabilities, allowing home entertainment, lighting, multimedia displays, and other devices to be autonomously or semi-autonomously reconfigured. At a concert venue, the lighting, microphones, speakers, displays, and other equipment may—when equipped with aerial capabilities—be rearranged autonomously to adhere to a predetermined configuration for a specific band or performance artist. In a laboratory, aerially-mobile research equipment, video camera, microphones, sensors, and/or other devices may reconfigure themselves to set up, assist in, record, or carry out an experiment. At recreational events, broadcasting equipment such as cameras and microphones may move among various configurations, recording the event from a variety of perspectives autonomously without the need for a separate camera at each vantage point. At large convention centers, devices for lighting and networking may fly to locations to provide wireless networking and illumination to sections of the convention center that are in use. In an industrial setting or in a warehouse, aerially-mobile devices may transition among various configurations based on activity within that environment and/or the locations of individuals within that environment. It should be understood that many different scenarios exist in which autonomous device reconfiguration may be utilized.

In each of the above-described examples, an environment may contain a number of predetermined device locations, docking stations, power chargers (wired or wireless), and/or other apparatuses that work in conjunction with aerially-mobile devices to perform autonomous or semi-autonomous device reconfiguration.

Figure 6A:
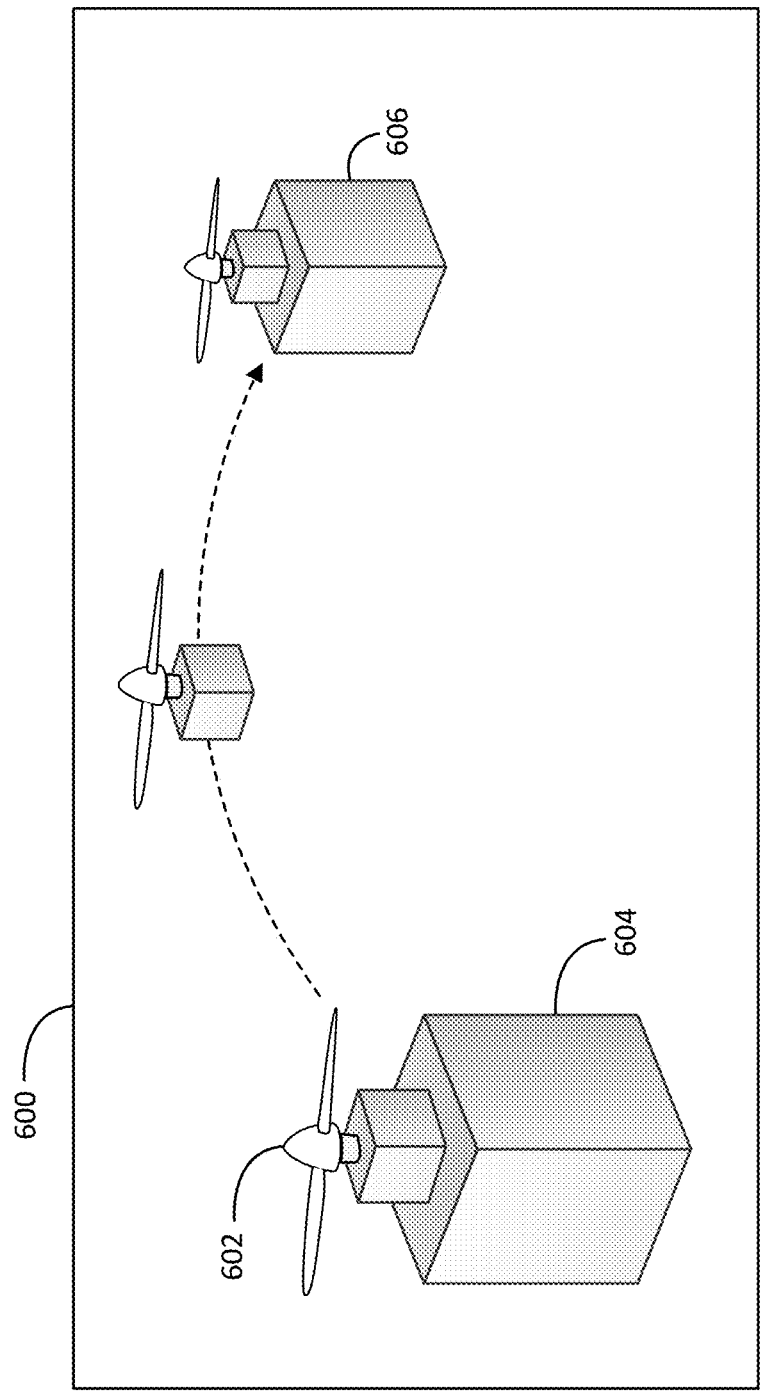
FIGS. 6A to 6C each illustrate a scenario involving aerially-mobile device configuration, according to an example embodiment.
Figure 6B:
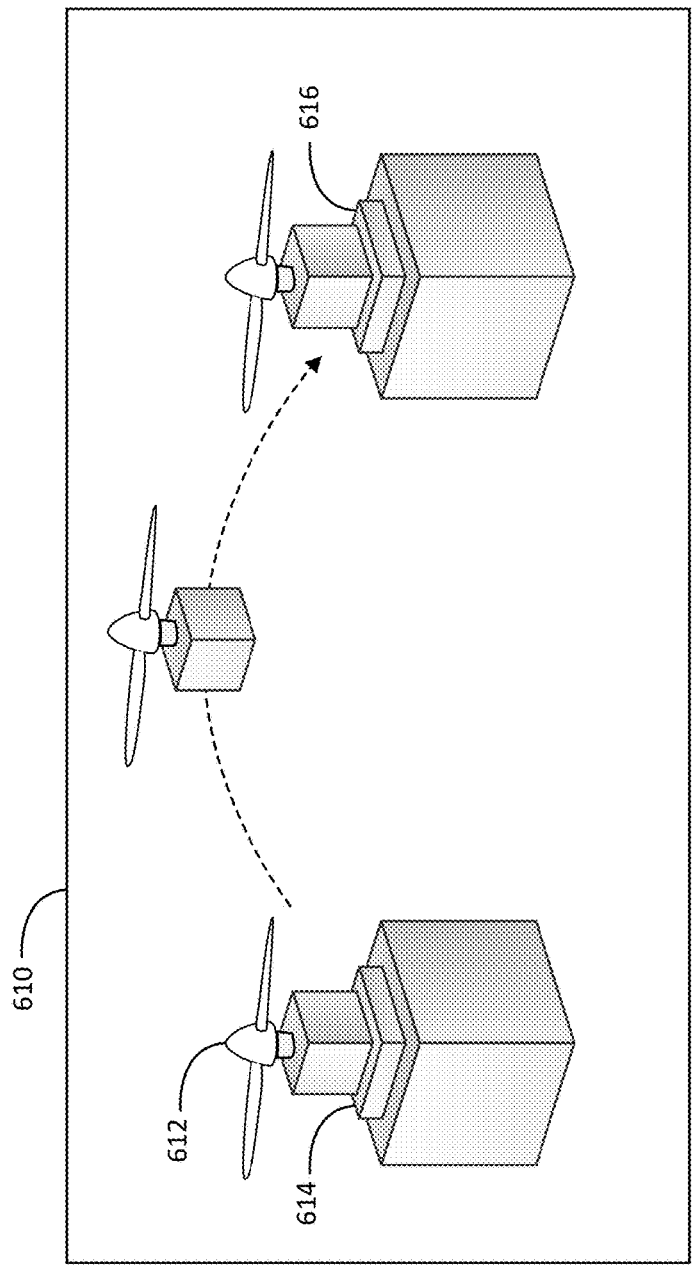
Figure 6C:
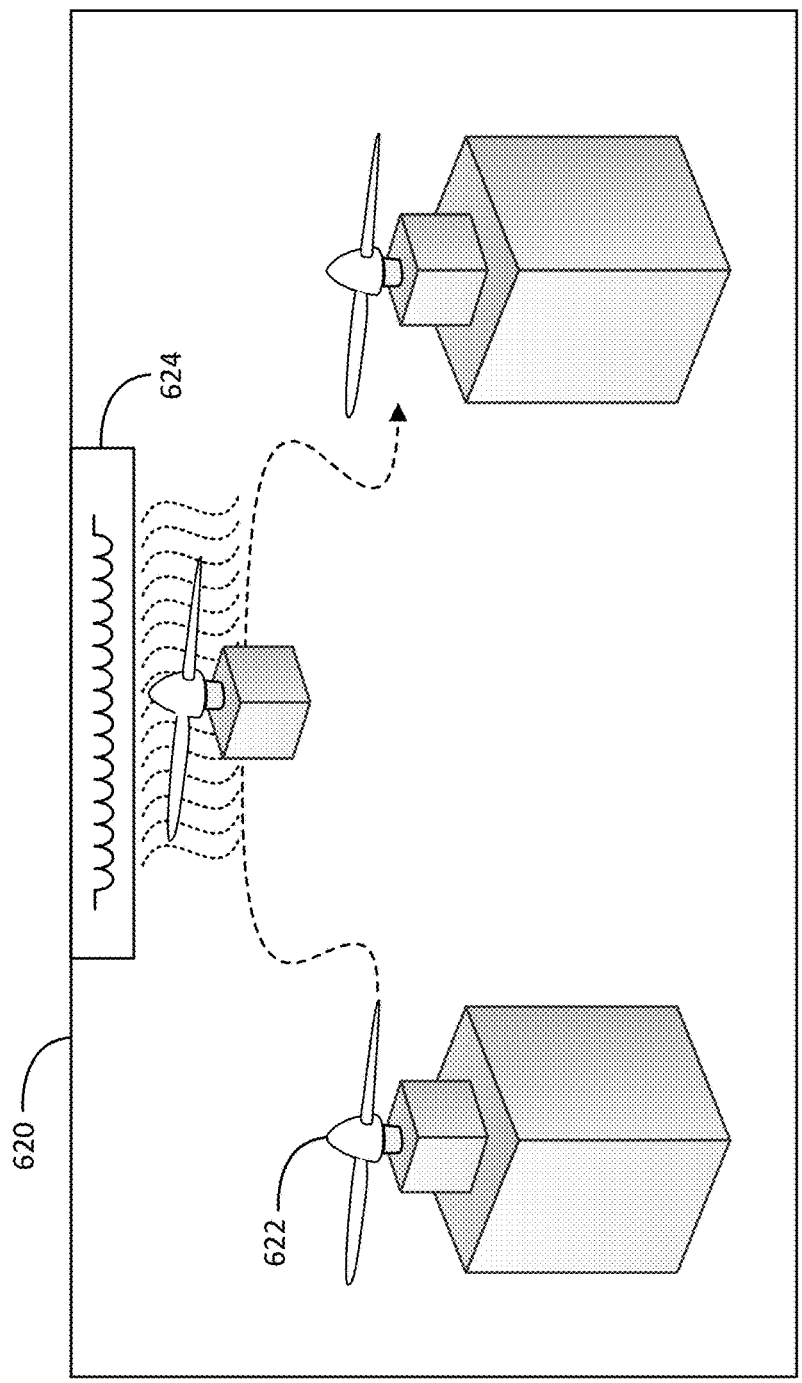

FIGS. 6A to 6C each illustrate a scenario involving aerially-mobile device configuration. In scenario 600 illustrated in FIG. 6A, an aerially-mobile device 602 is initially positioned atop platform 604. The aerially-mobile device 602 then receives instructions to fly and toward a new position located atop platform 606. After initiating flight, the aerially-mobile device 602 may travel substantially in the direction toward platform 606. Once the aerially-mobile device 602 lands on platform 606, the aerially-mobile device may conclude the flight and power down its propulsion system. Note that, in scenario 600, the flight path taken by aerially-mobile device 602 may be approximately a "direct" flight, in that its trajectory is an approximately direct route between platform 604 and platform 606. In other scenarios, an obstacle or other aerially-mobile device may be present along this trajectory, and the flight path may be altered (either during flight or prior to beginning flight) so as to avoid a collision.

Scenario 610 illustrated in FIG. 6B is similar to scenario 600 shown in FIG. 6A. However, in scenario 610, the platforms have docking stations 614 and 616. Each docking station may serve as a predetermined position for the aerially-mobile device 612 to land on. The docking stations 614 and 616 may have a geometry that is compatible with the aerially-mobile device 612, such that the aerially-mobile device 612 may be securely seated on the docking station upon landing. In some implementations, the aerially-mobile device 612 may have sensors or imaging systems that coordinate with the propulsion system of the aerially-mobile device 612 to facilitate the positioning and landing of aerially-mobile device 612 onto the docking stations 614 and 616. As one example, the aerially-mobile device may have an imager aimed down toward the ground and looks for a specific mark on a docking station, which may be used to align the aerially-mobile device before it descends onto that docking station. Other examples are also possible as well.

Scenario 620 illustrated in FIG. 6C is similar to scenario 600 shown in FIG. 6A. However, in scenario 620, a wireless charger 624 is located on the ceiling in between the two platforms. Additionally, aerially-mobile device 622 also has an energy storage element and hardware to facilitate the charging of that energy storage element (e.g., a battery and an inductive coil). Unlike the aerially-mobile device 602 in scenario 600, the aerially-mobile device 622 in scenario 620 flies along a less direct path between the two platforms. Here, the aerially-mobile device 622 first flies toward the wireless charger 624 so that it can receive power. Then, the aerially-mobile device 622 flies along a substantially level path in close proximity to the wireless charger 624 to continue to receive power. Once the aerially-mobile device 622 flies past the wireless charger 624, it then descends down toward its destination platform. This altering of the flight path—from a direct (or substantially direct) path to a modified path—may be performed in a variety of situations, such as when the aerially-mobile device's battery charge level is low, or when the aerially-mobile device's battery charge capacity is insufficient to sustain flight from a starting location to an ending location. Further, any number of wireless chargers may be placed at various locations within an environment, and the flight paths of aerially-mobile devices may be directed to fly near those wireless chargers when transitioning from one device configuration to another.

VIII. ILLUSTRATIVE METHODS

Example implementations relate to a control system that facilitates reconfiguration of aerially-mobile devices within a system. The control system may be a stand-alone control system, may be incorporated as part of at least one UAV (e.g., UAV 600), may be incorporated as part of a device system (e.g., device system 400 illustrated in FIG. 4), may be a remote computing device that communicates with aerially-mobile devices over a wide area network (e.g., the Internet), may be incorporated as part of at least one remote device (e.g., remote device 506), may be incorporated as part of at least one dispatch system (e.g., central dispatch system 508 and/or local dispatch system 510), and/or may be incorporated as part of at least one deployment system (e.g., deployment system 512), among other possibilities. Moreover, when the control system is incorporated as part of a UAV, this UAV may itself be the UAV being operated as described herein and/or the UAV may be another UAV, among other options.

Regardless of the arrangement in which the control system is found, the control system may generally include one or more processors and data storage (e.g., a non-transitory computer readable medium). Also, the control system may include program instructions that are stored on the data storage and are executable by one or more of the processors to carry out various operations, such as those discussed herein. Moreover, the control system may take various forms. For instance, the control system may take the form of a chip set, a server system, a digital signal processor, a programmable logic controller, and/or a sampled-data system, among other possibilities.

With these arrangements, the control system may operate an aerially-mobile device and/or a device system, among other entities. In doing so, the control system may transmit one or more commands, such as by way of one or more wired (e.g., via docking stations) or wireless communication links. More specifically, the control system may do so using at least one wireless communication interface that provide at least one wireless communication link.

A wireless link may include, for example, Bluetooth, NFC, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11). In other examples, the arrangement may include access points through which the various systems may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

Methods and operations disclosed herein are example implementations for the control system to carry out the reconfiguration and/or arrangement of aerially-mobile devices within an environment. Although the following description refers to operations being performed by a control system, it should be understood that operations may be performed by any type of computing device or electronic device, without departing from the scope of the disclosure.

Figure 7:
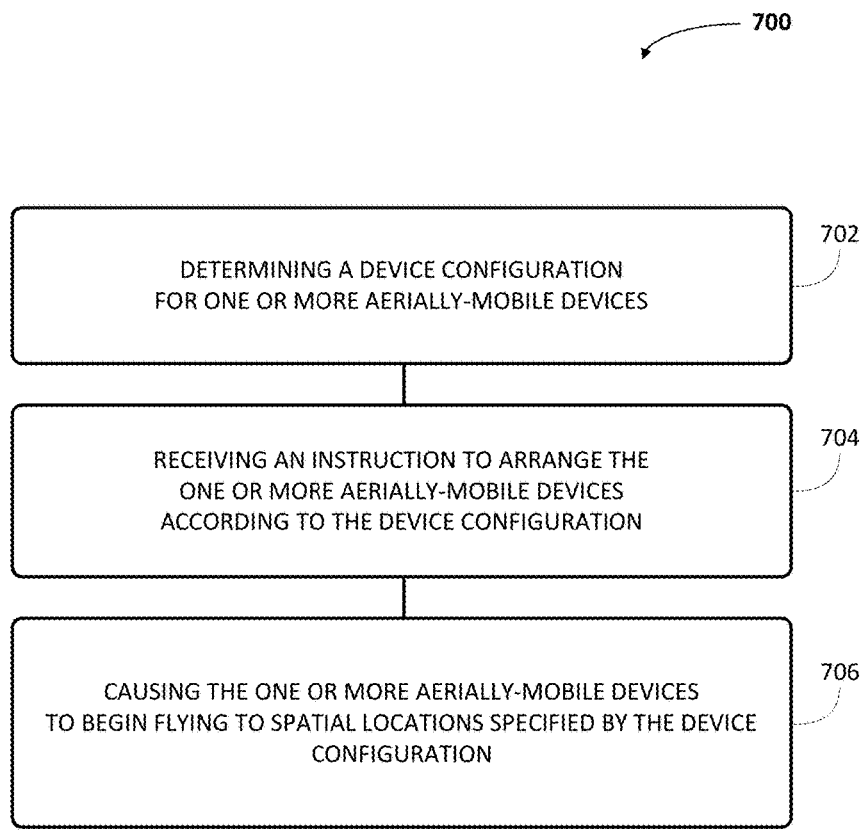
FIG. 7 is an example flowchart, according to an example embodiment.

FIG. 7 is an example flowchart illustrating method 700. Illustrative methods, such as method 700, may be carried out in whole or in part by a component or components in a control system, such as by the control system described above. However, it should be understood that example methods, such as method 700, may be carried out by other entities or combinations of entities (e.g., by other devices and/or combinations of devices), without departing from the scope of the disclosure.

It should be understood that for this and other processes and methods disclosed herein, flowcharts show functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, or compact-disc read only memory (CD-ROM), for example. The computer readable media may also be any other volatile or non-volatile storage systems. The computer readable medium may be considered a tangible computer readable storage medium, for example.

A. Determining a Device Configuration

As shown by block 702, the method 700 involves determining a device configuration for one or more aerially-mobile devices. The device configuration may specify a manner in which to arrange (e.g., spatial locations, orientations, etc.) and/or configure (e.g., by setting operational parameters) each aerially-mobile device.

The information included in a device configuration may depend upon the types of aerially-mobile devices present within the system. For example, a portion of a device configuration for a speaker might specify a spatial location (e.g., a position within a room), an orientation (e.g., where to point the speaker), and/or a speaker assignment (e.g., a particular channel in a multi-channel speaker system). As another example, a portion of a device configuration for a wireless router might specify a spatial location and/or wireless network configuration details (e.g., network ID, encryption method, password, etc.). As such, a device configuration—which may include a number of "portions" corresponding to respective aerially-mobile devices—might include any combination of configuration information.

Determining the device configuration may involve obtaining or retrieving it from a data storage device. In some implementations, a control system might store the device configuration on a local storage device. In other implementations, the control system might access a remote storage device, and may request or otherwise obtain the device configuration from that remote storage device over a network.

In some instances, the device configuration may be set by a user or manufacturer of a device system. For example, a user might, through a software that interfaces with the control system, specify a device configuration by setting the locations, orientations, and/or other configuration details of various aerially-mobile devices in the system. As another example, a manufacturer may provide device configurations for aerially-mobile device systems. As yet another example, the device configuration may be set by obtaining a plurality of spatial locations associated with docking stations within the environment, and assigning, for each aerially-mobile device, a spatial location corresponding with a respective docking station.

In some embodiments, the device configuration may not be manually set by a user or manufacturer, but is instead computationally determined to accomplish some goal or otherwise meet design objectives. Such a goal might be a desired high level end result or property of the device system, which may be achieved through a cooperative operation of the end-use functions of the aerially-mobile devices and/or the arrangement of those devices.

The extent to which a goal is accomplished may be a measurable property or aspect of the device system. In a system of aerially-mobile light sources, an example goal may be to maximize illumination of a particular area within the environment. The control system may include models of the aerially-mobile light sources (which could specify, for example, the brightness of those light sources, the angle of illumination from those light sources, etc.) and of the environment, which could serve as a basis for determining a light source arrangement that maximizes the illumination of the particular area within the environment. The control system may simulate two or more configurations, evaluate the degree to which the goal is achieved (in this example, the level of illumination of the particular area), and then select the configuration that best accomplishes that goal. Note that, in some instances, a limited number of configurations may be tested, and the best (or a satisfactory) configuration may be selected from the evaluated configuration candidates; thus, in this example, the configuration may not necessarily maximize illumination, but rather provide the greatest amount of illumination from among the evaluated configurations.

In some implementations, the control system may instruct the device system to physically arrange itself to determine a satisfactory device configuration "ad-hoc." Such an ad-hoc configuration may occur iteratively, alternately arranging the aerially-mobile devices and evaluating that arrangement until a satisfactory result is reached. Referring back to the light illumination example above, the aerially-mobile light sources might arrange themselves according to an initial set of locations and/or orientations and then evaluate the extent to which that initial configuration accomplishes the goal. If the goal is not satisfactorily met, then the devices might adjust their positions and/or orientations, and the evaluation may be repeated until a satisfactory level of illumination (e.g., meets or exceeds a threshold level of illumination) is met.

In addition to goals, the control system might consider constraints when determining the device configuration. A constraint may be any limitation, prohibition, or restriction that limits the manner in which a device may be arranged or configured. Referring back to the light illumination example above, a constraint may be a set of light sockets to which the light sources must be attached after reconfiguration has concluded. This constraint limits the spatial locations at which the aerially-mobile light sources can be placed, such that any other spatial location is prohibited (since the light source cannot dock at other locations). Any number of goals and/or constraints may be considered when determining the device configuration.

In some implementations, a constrained optimization may be performed to determine an optimal or satisfactory device configuration. The constrained optimization may be a numerical analysis performed on a computing device that assesses many device configurations and assigns to them a score, which can serve as a basis for selecting a device configuration. The constrained optimization may evaluate one or more system properties (i.e., variables) to accomplish a goal (e.g., maximizing a variable, minimizing a variable, meeting a threshold for a variable, meeting a particular value for that variable, etc.) given one or more constraints.

As another example, determining the device configuration may involve assessing aspects of the environment, changes to that environment, relative positions and/or orientations of other devices in the system, and making adjustments accordingly. As one example, a microphone equipped aerially-mobile speaker may coordinate its position with another similar aerially-mobile speaker to provide for an improved listening experience within a particular environment. The two speakers may each emit a reference tone that the opposite speaker captures via a microphone. In some implementations, the reference tone emitted by one speaker may be projected to bounce off of objects within the environment before being captured by the other speaker, which in turn may analyze tonal qualities of the reflected reference tone to determine whether or not adjustments to the position or orientation of the speaker would improve the sound quality within the environment. Changes in room geometry—which may occur when a user moves furniture within a room, for example—may impact the acoustics of the room. The aerially-mobile speakers may detect these changes in room acoustics and make adjustments to their position and/or orientation to improve any degradation in sound quality.

Additionally, a control system may be configured to maintain a goal over some duration of time. If changes to the environment adversely impact a current device configuration's extent to which it accomplishes the goal, the control system may instruct those devices to make adjustments to their position and/or orientation to maintain the goal. For example, a goal of an aerially-mobile speaker system may be to maximize sound delivered to a particular point relative to the sofa in a living room, because users may typically sit on the sofa when watching television or movies. If a user moves the sofa (e.g., when rearranging furniture), devices in the system may detect the environmental change, determine the new location of the sofa (e.g., through reference tone reflection analysis, imaging systems, etc.), then rearrange and/or reorient themselves in order to redirect the speaker sound to the new sofa location. The extent to which a device system accomplishes a goal may thus be reevaluated periodically (or upon receipt of a user instruction to do so), and the control system may make adjustments to the device configuration in order to maintain that goal. Note that any kind of sensor reading, and/or any combination of sensor readings, may be used to facilitate the above-described configuration adjustments.

Regardless of the particular implementation, the method 700 may involve obtaining a predetermined device configuration, generating a device configuration, and/or discovering a device configuration ad-hoc.

B. Receiving an Instruction to Arrange the Aerially-Mobile Devices

As shown by block 704, the method 700 involves receiving an instruction to arrange the one or more aerially-mobile devices according to the device configuration. The instruction may be provided as a user input, either through intentional user action or based on a detected user behavior. As one example, a user may instruct the aerially-mobile devices to reconfigure themselves according to a device configuration by interacting with a button, switch, or other interface on one of the aerially-mobile devices. As another example, a user may initiate the reconfiguration by transmitting an instruction to the control system via a smartphone, tablet, or other computing device. As yet another example, a user may speak aloud voice commands, which could be received at a microphone in communication with the control system and may cause the control system to initiate the reconfiguration if a certain word, phrase, or command is detected.

In other instances, the device reconfiguration may be initiated based on a certain environmental or temporal condition. For example, the system may be set to reconfigure itself according to a device configuration at a specified date and/or time. Once that date and/or time has been reached, the device system may automatically begin the reconfiguration. Additionally, sensors or imaging systems may detect changes in the environment that trigger the control system to send instructions to initiate reconfiguration. For example, a proximity sensor may sense the presence of a user in a room and may responsively inform the control system that a user has either entered or exited a room, which may in turn cause the control system to initiate a reconfiguration operation. As described herein, such events that initiate reconfiguration may be referred to as "triggering events."

In some embodiments, triggering events may be caused by state changes in the aerially-mobile devices. Some example state changes include when an aerially-mobile device's battery level is low or fully charged or when a particular aerially-mobile device is damaged or otherwise stops performing its end-use function, among other possible state changes. For instance, a device system may be instructed to reconfigure itself once all of the aerially-mobile devices are fully charged, so that the aerially-mobile devices have sufficient power to fly to their new destinations. As another example, if a particular aerially-mobile device is damaged or otherwise cannot carry out its end-use function, the collective performance of the set of aerially-mobile devices is affected; thus, the failure of an aerially-mobile device may act as a triggering event, causing the device system to reconfigure itself to account for the failed aerially-mobile device.

In other examples, the control system may receive instructions to initiate reconfiguration over a network (e.g., a wide area network or the Internet), which would permit a user to reconfigure a device system remotely. Various other examples are also possible. It should be understood that the instruction to initiate reconfiguration may be a received input, induced through a triggering event, or occur responsive to changes in time or other environmental conditions.

C. Causing the Aerially-Mobile Devices to Begin Flying to Spatial Locations Specified by the Device Configuration As shown by block 706, the method 700 involves causing the one or more aerially-mobile devices to begin flying to spatial locations specified by the device configuration. Causing flight to begin may involve, in some embodiments, the control system transmitting instructions to each of the one or more aerially-mobile devices. Such instructions may, in addition to commanding the aerially-mobile devices to begin flight, also provide contextual information about that flight (e.g., the spatial location of the aerially-mobile device's destination, a trajectory along which the aerially-mobile device is instructed to fly, a time delay that must elapse prior to beginning flight, etc.).

In some embodiments, the control system may perform flight planning operations to determine the trajectories and timing of the flights for each of the aerially-mobile devices during a reconfiguration operation. In some instances, the control system may evaluate direct flight paths between starting and ending locations for each aerially-mobile device, and subsequently adjust the timing of those flights to ensure that no collisions occur between aerially-mobile devices. In other instances, the flight paths may be specified to take into account certain obstacles, wireless charging elements present within the environment, docking station geometries, etc. For example, a flight path may stray from an otherwise direct flight path so that it flies in close proximity to a wireless charger, which supplies power to the nearby aerially-mobile device during a reconfiguration flight. As such, the control system may coordinate the flight paths and timing of each aerially-mobile device prior to initiating reconfiguration.

In other embodiments, variations in the flight path and/or timing may occur automatically during reconfiguration. In some cases, an aerially-mobile device may be equipped with sensors, imaging devices, and/or short range communication systems that enable the device to detect the presence of nearby aerially-mobile devices and/or other obstacles. If the aerially-mobile device determines that a collision between it and an obstacle or other aerially-mobile device could potentially occur, that aerially-mobile device may adjust its trajectory, speed, heading, and/or altitude to avoid the collision.

In an example, the control system may determine, based at least on a geometry of the environment and present spatial locations of the plurality of aerially-mobile devices, a flight plan that includes, for each aerially-mobile device, (i) a trajectory representative of a flight path for the aerially-mobile device to fly along and (ii) a relative time with respect to a reference time at which to begin flight, where the flight plan is determined to avoid collisions among the plurality of aerially-mobile devices during flight.

IV. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A system comprising:
    a plurality of aerially-mobile devices each configured to (i) perform a respective end-use function from a plurality of end-use functions comprising at least a first and a second end-use functions, and (ii) carry out a portion of a reconfiguration operation, wherein the reconfiguration operation includes arranging the plurality of aerially-mobile devices according to a device configuration, wherein the device configuration specifies a plurality of spatial locations within an home environment and a functionality to be provided via an aerially-mobile device landed at each of the spatial locations in the home environment, wherein the first and second end-use functions correspond to a first and a second of the spatial locations; and
    a control system comprising a processor and a data storage, the data storage containing instructions comprising:
        assigning, for at least a first and a second of the aerially-mobile devices, a respective spatial location associated with the device configuration, wherein the first and second aerially mobile devices are assigned to a first and a second spatial location in the home environment, respectively; and
        causing the first and second aerial vehicles to fly to and land at the first and second spatial locations in the home environment, respectively, such that the first and the second aerially-mobile devices are arranged to provide the first and second end-use functions while landed at the first and second spatial locations, respectively.

2. The system of claim 1, further comprising one or more docking stations located at the respective spatial locations.

3. The system of claim 2, wherein a given aerially-mobile device includes a power terminal, wherein a given docking station includes electrical contacts that electrically couple to the power terminal, and wherein the given docking station is configured to supply power to the given aerially-mobile device via the electrical contacts.

4. The system of claim 2, wherein a given aerially-mobile device includes a wireless power receiver, wherein a given docking station includes a wireless power transmitter that magnetically couples with the wireless power receiver, and wherein the given docking station is configured to supply power to the given aerially-mobile device via the wireless power transmitter.

5. The system of claim 1, further comprising one or more wireless power transmitters situated within the environment, wherein the first aerially-mobile device includes a wireless power receiver configured to magnetically couple with a given wireless power transmitter when the first aerially-mobile device is within a threshold distance from the given wireless power transmitter.

6. The system of claim 5, wherein causing the first aerially-mobile device to fly to the first spatial location comprises:
    prior to the first aerially-mobile device arriving at the first spatial location, causing the first aerial vehicle to fly to a location that is within the threshold distance from a particular wireless power transmitter of the one or more wireless power transmitters.

7. The system of claim 1, wherein causing the first aerially-mobile device to fly to the first spatial location comprises receiving a user input indicative of a command to begin execution of the reconfiguration operation.

8. A computer-implemented method comprising:
    determining, by a computing device, a device configuration indicative of an arrangement of a plurality of aerially-mobile devices within a environment, wherein the device configuration specifies a plurality of spatial locations within the environment and a respective end-use function from a plurality of end-use functions to be provided via an aerially-mobile device landed at each spatial location for each aerially-mobile device within the environment, wherein the plurality of end-use functions comprises a first and a second end-use function corresponding to a first and a second of the spatial locations, respectively;
    receiving an input indicative of an instruction to arrange the plurality of aerial vehicles according to the device configuration;
    responsive to receiving the input:
        assigning a first and a second of the aerially-mobile devices to a first and a second of the spatial locations in the environment, respectively; and
        causing the first and second aerial vehicles to fly to and land at the first and second spatial locations in the environment, respectively, such that the first and the second aerially-mobile devices are arranged to provide the first and second end-use functions while landed at the first and second spatial locations, respectively.

9. The computer-implemented method of claim 8, wherein determining the device configuration comprises:
    receiving a goal indicative of a desired property of a system that includes the plurality of aerially-mobile devices;
    receiving one or more constraints indicative of configuration limitations for the plurality of aerially-mobile devices; and
    based on the goal and the one or more constraints, determining the device configuration as a device configuration that satisfactorily accomplishes the goal and complies with the one or more constraints.

10. The computer-implemented method of claim 9, wherein the goal specifies a threshold level of the desired property, and wherein the goal is satisfactorily accomplished when the device configuration has a level of the desired property that exceeds the threshold level.

11. The computer-implemented method of claim 9, wherein the constraints include geometric boundaries of the environment.

12. The computer-implemented method of claim 9, wherein the constraints include one or more predetermined spatial locations that the plurality of aerially-mobile devices are limited to land on.

13. The computer-implemented method of claim 8, further comprising:
   determining, based at least on a geometry of the environment and present spatial locations of the plurality of aerially-mobile devices, a flight plan that includes, for each of the aerially-mobile devices, (i) a trajectory representative of a flight path for the aerially-mobile device to fly along and (ii) a relative time with respect to a reference time at which to begin flight, wherein the flight plan is determined to avoid collisions among the plurality of aerially-mobile devices during flight.

14. The computer-implemented method of claim 8, wherein the first and second spatial locations correspond to a first and a second docking station, respectively.

15. The computer-implemented method of claim 8, wherein the device configuration also specifies an operational parameter for the first aerially-mobile device, wherein the operational parameter is indicative of a manner in which the first aerial vehicle carries out the first end-use function, and wherein the method further comprises:
   configuring the first aerially-mobile device based on the operational parameter specified by the device configuration.

* * * * *